United States Patent
Hamlet et al.

(10) Patent No.: US 10,700,872 B1
(45) Date of Patent: Jun. 30, 2020

(54) SYSTEM FOR AUTHENTICATING AN ADDITIVELY MANUFACTURED OBJECT

(71) Applicant: National Technology & Engineering Solutions of Sandia, LLC, Albuquerque, NM (US)

(72) Inventors: Jason Hamlet, Albuquerque, NM (US); Todd Bauer, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 219 days.

(21) Appl. No.: 15/838,856

(22) Filed: Dec. 12, 2017

Related U.S. Application Data (60) Provisional application No. 62/461,496, filed on Feb. 21, 2017.

(51) Int. Cl.
  *H04L 29/06* (2006.01)
  *H04L 9/32* (2006.01)
  *H04L 9/08* (2006.01)

(52) U.S. Cl.
  CPC .......... *H04L 9/3247* (2013.01); *H04L 9/0866* (2013.01)

(58) Field of Classification Search
  CPC ............................ H04L 9/3247; H04L 9/0866
  See application file for complete search history.

(56) References Cited

U.S. PATENT DOCUMENTS

| | | | |
|---|---|---|---|
| 5,451,759 A * | 9/1995 | Hoshino | G06K 7/084 235/449 |
| 7,162,035 B1 | 1/2007 | Durst et al. | |
| 8,171,567 B1 * | 5/2012 | Fraser | G06T 1/0021 726/32 |
| 8,245,306 B2 | 8/2012 | Gimenez | |
| 2003/0081247 A1 | 5/2003 | Sharma | |
| 2006/0283931 A1 | 12/2006 | Polli et al. | |
| 2012/0317662 A1 * | 12/2012 | Neo | G06F 21/44 726/34 |
| 2014/0117585 A1 | 5/2014 | Douglas et al. | |
| 2014/0156053 A1 | 6/2014 | Mahdavi et al. | |
| 2015/0170013 A1 * | 6/2015 | Wilson | B29C 64/00 235/468 |
| 2015/0262347 A1 * | 9/2015 | Duerksen | G06T 7/0002 382/182 |
| 2016/0259306 A1 * | 9/2016 | Pangrazio, III | H04L 9/3247 |
| 2018/0286035 A1 * | 10/2018 | Kozicki | G07D 7/2033 |

OTHER PUBLICATIONS

Pim Tuyls and Boris Skoric, "Physical Unclonable Functions for enhanced security of tokens and tags", Security Electronic Business Processes, Vieweg (2006), pp. 30-37 (Year: 2006).*

* cited by examiner

*Primary Examiner* — Joseph P Hirl
*Assistant Examiner* — Chi D Nguy
(74) *Attorney, Agent, or Firm* — Madelynne J. Farber; Mark A. Dodd (57) ABSTRACT

A method for authenticating an additively manufactured (AM) object is disclosed herein. A computing device obtains a measurement that is indicative of a stochastic distribution of dopant incorporated into the AM object. The computing device generates authentication data for the AM object based upon the measurement, and authenticates the AM object based upon the authentication data.

20 Claims, 9 Drawing Sheets

SYSTEM FOR AUTHENTICATING AN ADDITIVELY MANUFACTURED OBJECT

RELATED APPLICATION

This application claims priority to U.S. Provisional Patent Application No. 62/461,496, filed on Feb. 21, 2017, the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Additive manufacturing is a category of manufacturing techniques that produce three-dimensional objects layer-by-layer. Each layer of an additively manufactured (AM) object is generally thin, such as between 10 to 100 µm. Additive manufacturing offers design flexibility not available with traditional machining approaches, and is empowered by software that can contribute to properties of additively manufactured parts. For example, the composition and geometry of each layer can be stored in a computer file. An additive manufacturing apparatus can deposit materials in accordance with each layer stored in the computer file so as to form a three-dimensional object. Objects produced via additive manufacturing often produce less waste material and can be manufactured using less energy than traditional manufacturing techniques.

Conventionally, however, there is no suitable technique for authenticating an AM object. In certain scenarios (e.g., high-security applications), it may be desirable to ensure that an authentic AM object is one that is actually deployed (rather than a counterfeit). Existing approaches for authenticating AM objects involve embedding electronic circuitry into the AM object, which complicates the creation of the AM object and adds expense.

SUMMARY

The following is a brief summary of subject matter that is described in greater detail herein. This summary is not intended to be limiting as to the scope of the claims.

Described herein are various technologies pertaining to authenticating an additively manufactured object (AM) object. More specifically, the technologies described herein allow for authentication of an AM object without requiring the AM object to have circuitry embedded therein.

With respect to enrollment of an AM object, a stochastic distribution of a dopant can be applied into and/or onto an AM object. The dopant may be incorporated into the AM object during or after manufacture of the AM object. The dopant may be particles of antimony, phosphorous, arsenic, boron, aluminum, gallium, sulfur, selenium, tellurium, silicon, germanium, cadmium, magnesium, zinc, or combinations thereof. A measurement device generates a measurement that is indicative of the stochastic distribution of the dopant at least one location on the AM object, wherein the measurement device can be an ohmmeter, a spectrometer, or the like, and a computing device receives such measurement. The computing device generates a signature for the AM object based upon the measurement, and the signature is stored in a data store. Accordingly, the signature for the AM object is a function of the stochastic distribution of the dopant applied into and/or onto the AM object. There are numerous approaches for generating such signature.

When the AM object is authenticated, a measurement device (which may be the same measurement device used to generate the measurement referenced above or a different measurement device that generates the same type of measurement) generates a second measurement that is indicative of the stochastic distribution of the dopant in or on the AM object. The computing device generates a test signature based upon the second measurement, compares the test signature with the signature, and authenticates the AM object when the signatures match or are within a threshold amount of similarity to one another. Accordingly, the AM object is authenticated based upon stochastic distribution(s) of a dopant applied into and/or onto the AM object during enrollment, rather than based upon electronics embedded within or attached to the AM object. In other embodiments, rather than comparing the signature and test signature directly, an encryption scheme can be employed, wherein one or more encryption keys are generated based upon the signature and test signature, and a determination as to whether the AM object is authentic can be based upon data encrypted by way of the encryption keys.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to authenticating an additively manufactured (AM) object are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "device" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Figure 1:
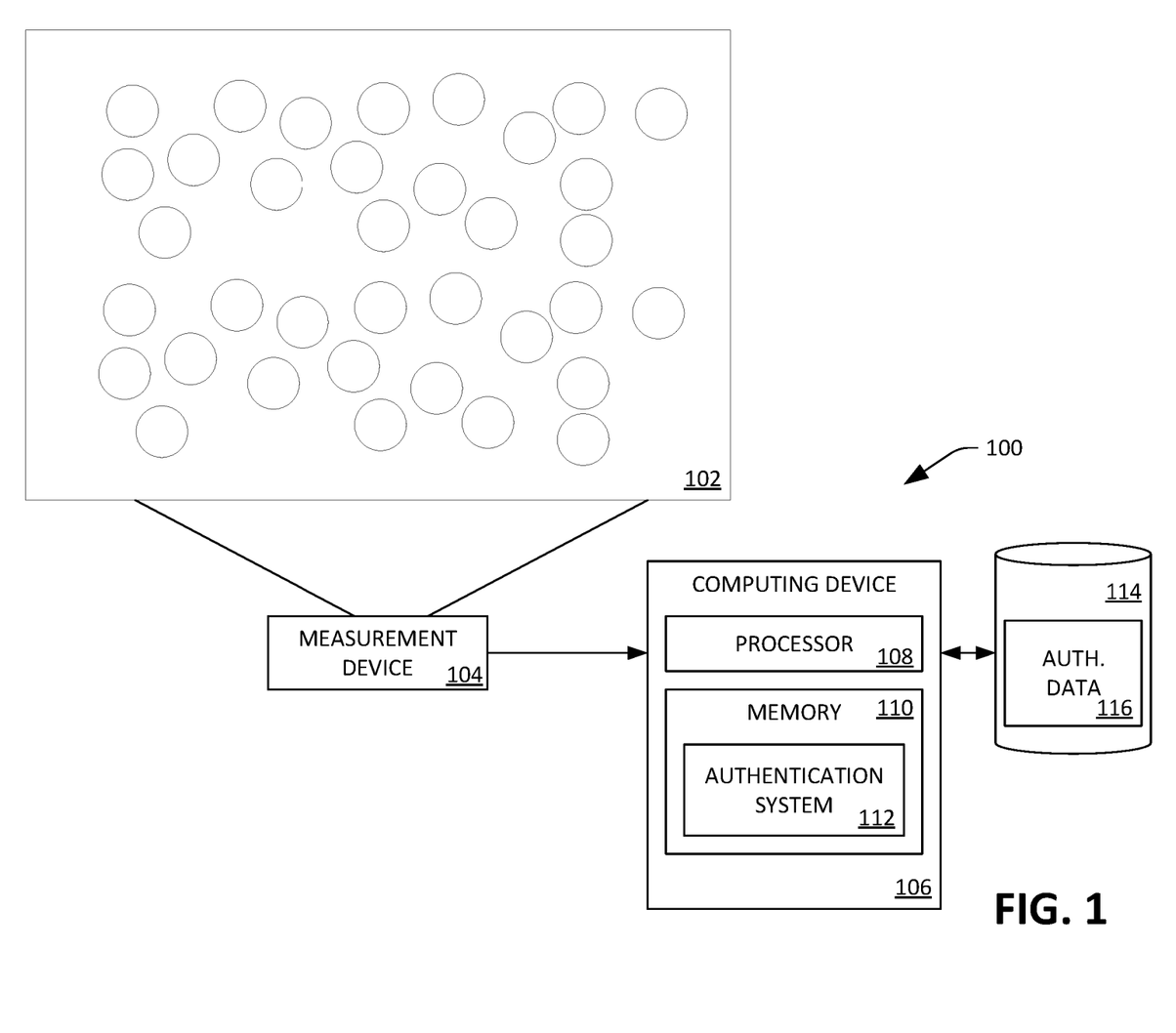
FIG. 1 is a diagram of an exemplary system for authenticating an AM object.

With reference to FIG. 1, an exemplary system 100 for authenticating an AM object is depicted. An AM object 102 produced through an additive manufacturing process is illustrated. For example, the AM object 102 can be produced layer-by-layer using an additive manufacturing apparatus configured for vat photopolymerization, material jetting, binder jetting, material extrusion, powder bed fusion, sheet lamination, or directed energy deposition. Furthermore, the AM object 102 may be made of metals, polymers, metalloids, resins, waxes, or combinations thereof. The AM object 102 includes a stochastic distribution of dopant incorporated therein (where individual dopant elements are illustrated as circles in FIG. 1). In an embodiment, the dopant may be particles of antimony, phosphorous, arsenic, boron, aluminum, gallium, sulfur, selenium, tellurium, silicon, germanium, cadmium, magnesium, zinc, or combinations thereof. In an embodiment, the dopant may be incorporated into the AM object 102 after production of the AM object 102. For instance, the dopant may be sprayed or painted onto a surface of the AM object 102. In another embodiment, the dopant may be incorporated into a feedstock material used to generate the AM object 102.

In general, the dopant incorporated into the AM object 102 is selected based on several factors. First, the dopant should not interfere with the functionality or quality of the AM object 102. As such, it is contemplated that the dopant will be present in an amount of 0.01 to 1% of a total mass of the AM object 102. For instance, the dopant may be present in an amount of 0.05 to 0.95%, 0.1 to 0.6%, or 0.3 to 0.5% of the total mass of the AM object 102. Second, the dopant should exhibit one or more measurable properties that can be used in authenticating the AM object 102. In an example, the dopant may exhibit an electrical resistance, capacitance, and/or inductance, which differs from an electrical resistance of the material(s) from which the AM object 102 is generated. In another example, the dopant may emit energy (in the form of light, electricity, sound, etc.) when excited by an external stimulant (e.g., radiation).

The system 100 includes a measurement device 104 that is configured to generate a measurement of a property of the stochastic distribution of dopant incorporated into the AM object 102. In an example, the measurement device 104 may be an ohmmeter and may measure an electrical resistance of the stochastic distribution of dopant. In another example, the measurement device 104 may be a spectrometer and may measure light emitted from the stochastic distribution of dopant. In yet another example, the measurement device 104 may be a capacitance meter and may measure a capacitance of the stochastic distribution of dopant.

The system 100 may also include a computing device 106. In an example, the computing device 106 may be a mobile computing device, a desktop computing device, a laptop computing device, etc. The computing device 106 comprises a processor 108 and memory 110, wherein the memory 110 has an authentication system 112 loaded therein. Generally, the authentication system 112, when executed by the processor 108, is configured to authenticate the AM object 102 based on a measurement generated by the measurement device 104 (e.g., which is indicative of the stochastic distribution of dopant incorporated into and/or onto the AM object 102). More specifically, the computing device 106 is configured to receive the measurement from the measurement device 104, wherein the measurement device 104 may transmit the measurement to the computing device 106 over a wired connection (e.g., Universal Serial Bus). In another example, the measurement device 104 may transmit the measurement to the computing device 106 over a wireless connection. In an embodiment, the measurement device 104 may be incorporated into the computing device 106.

The system 100 further includes a (secure) data store 114. The data store 114 comprises authentication data 116 for the AM object 102, wherein the authentication data 116 is based upon a previously generated measurement that is indicative of stochastic distribution of the AM object 102, and is used by the authentication system 112 to authenticate the AM object 102. In an embodiment, the authentication data 116 may be a bit string. In an embodiment, the data store 114 may be incorporated into the computing device 106. Further, the data store 114 may be part of a server computing device (not shown) that may be in communication with the computing device 106 by way of a network (e.g., Internet). While the data store 114 is illustrated as comprising a single instance of authentication data, it is understood that the data store 114 can comprise many different instances of authentication data for many different AM objects.

Exemplary operation of the system 100 is now set forth. Prior to the authentication system 112 authenticating the AM object 102, the AM object 102 is enrolled with the authentication system 112. During enrollment, a measurement device (which may or may not be the measurement device 104) generates a measurement that is indicative of the stochastic distribution of dopant incorporated into and/or onto the AM object 102. The authentication data 116 is generated based upon such measurement, and various different approaches for generating the authentication data 116 will be described in greater detail below. It is contemplated that the authentication data 116 for the AM object 102 will be generated shortly after manufacture of the AM object 102; however, other arrangements are possible.

The authentication system 112 authenticates the AM object 102 by generating test authentication data, which, if the AM object 102 is authentic, should match (or be highly similar to) the authentication data 116 generated during enrollment of the AM object 102 with the authentication system 112. With more specificity, when the AM object is to be authenticated, the measurement device 104 generates a second measurement that is indicative of the stochastic distribution of dopant incorporated into and/or onto the AM object 102, and the computing device 106 receives the second measurement. Responsive to receiving the second measurement, the authentication system 112 generates test authentication data for the AM object 102 based on at least the second measurement. The computing device 106 can then retrieve the authentication data 116 for the AM object 102 from data store 114 and perform a comparison between the authentication data 116 for the newly-generated test authentication data. When the AM object 102 is authentic and has not been tampered with, the authentication data 116 and the test authentication data are expected to be identical (or near identical). In an embodiment where the authentication data 116 and the test authentication data are bit strings, the authentication system 112 can authenticate the AM object 102 when 95 to 100% of bits in the authentication data 116 and the test authentication data are identical. In other examples, the authentication system 112 can authenticate the AM object 102 when 95.5 to 100%, 98 to 100%, or 99 to 100% of bits of the authentication data 116 and bits of the test authentication data are identical.

The computing device 106 may then output an indication that the AM object 102 is authentic responsive to determining that the AM object 102 is authentic. For example, the computing device 106 can output an audio or visual indication that the AM object 102 is authentic. In an embodiment, the computing device 106 may transmit the indication to another computing device by way of a network connection.

Figure 2:
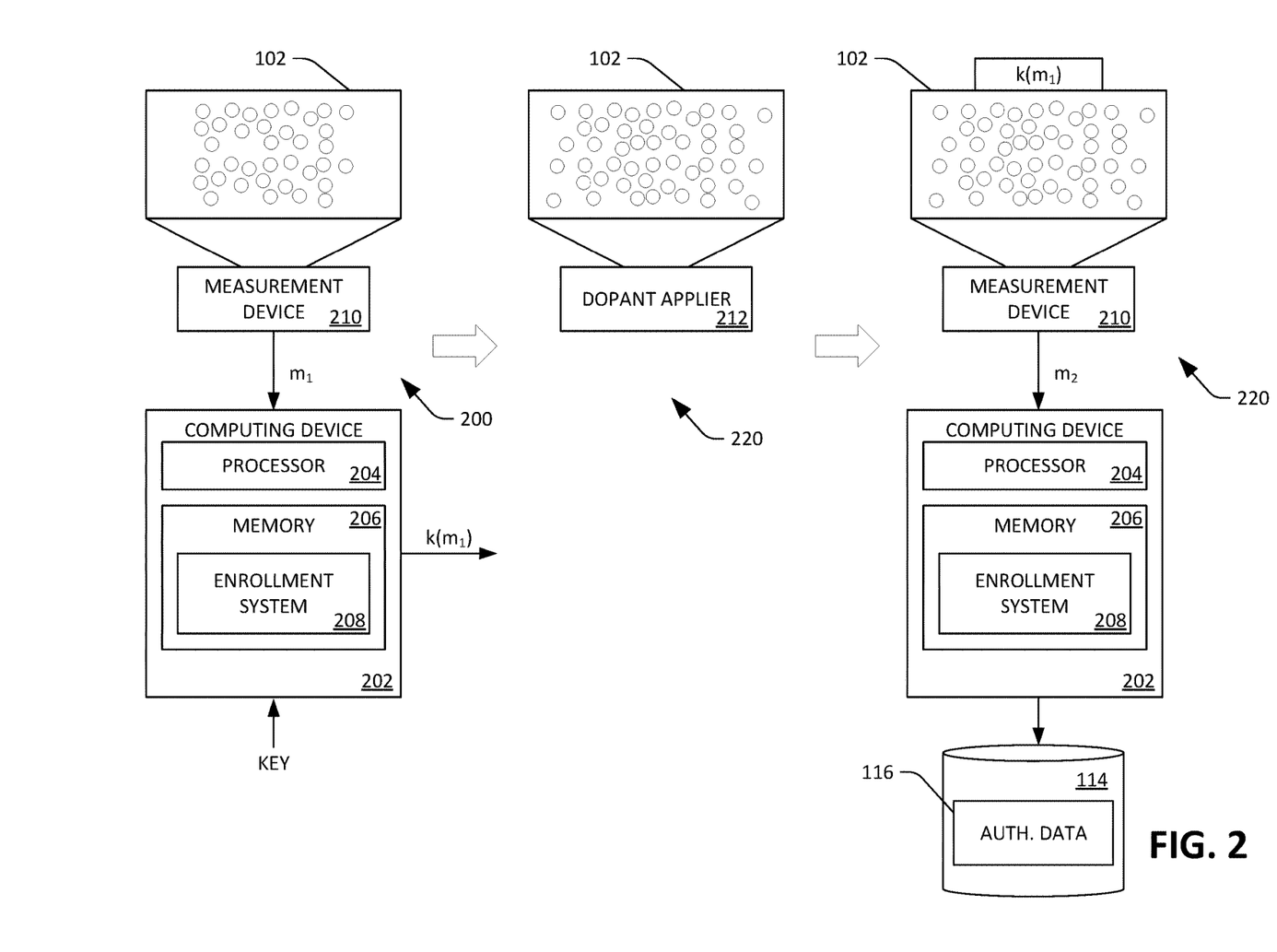
FIG. 2 is a schematic illustrating enrollment of an AM object with an authentication system.

Turning now to FIG. 2, an exemplary approach for enrolling an AM object with the authentication system 112 is illustrated. In the example depicted in FIG. 2, at a first step 200, a measurement device 210 generates a measurement $m_1$ that is indicative of a stochastic distribution of dopant (illustrated as circles in FIG. 2) incorporated in an AM object 102. A computing device 202, which may be a mobile computing device, a desktop computing device, a laptop computing device, etc., is in communication with the measurement device 210. The computing device 202 comprises a processor 204 and memory 206, wherein the memory 206 has an enrollment system 208 loaded therein. Generally speaking, the enrollment system 208 is configured to generate and store authentication data for the AM object 102, wherein the authentication data can be subsequently employed to authenticate the AM object 102. With more specificity, the computing device 202 receives $m_1$ generated by the measurement device 210, and encrypts $m_1$ using an encryption key k to generate encrypted measurement $k(m_1)$. The encrypted measurement $k(m_1)$ may then be incorporated onto a surface of the AM object 102. For instance, $k(m_1)$ may be etched or painted onto the surface of the AM object 102.

At a next step 220 of the enrollment process, a dopant applier 212 stochastically applies additional dopant to the AM object 102, thereby incorporating a second stochastic distribution of dopant into and/or onto the AM object 102; accordingly, $m_1$ is unable to be recreated. In other words, the additional dopant applied by the dopant applier 212 masks the initial stochastic distribution of dopant of the AM object 102.

At step 222, after the dopant applier 212 has stochastically applied additional dopant to the AM object 102, the measurement device 210 can generate a second measurement ($m_2$) that is indicative of the second stochastic distribution of dopant incorporated into the AM object 102, and the computing device 202 receives $m_2$. The enrollment system 208 may then generate authentication data 216 for the AM object 102 based upon $m_1$ and $m_2$. For example, $m_2$ can be appended to $m_1$ and provided as input to a function (e.g., a hash function), wherein the output can be stored in a secure data store 214 as the authentication data 216 for the AM object 102. Therefore, after the enrollment procedure shown in FIG. 2, $k(m_1)$ is applied to the AM object 102 and can be read from the AM object 102, and the authentication data 216 for the AM object 102 is retained in the data store 214.

Figure 3:
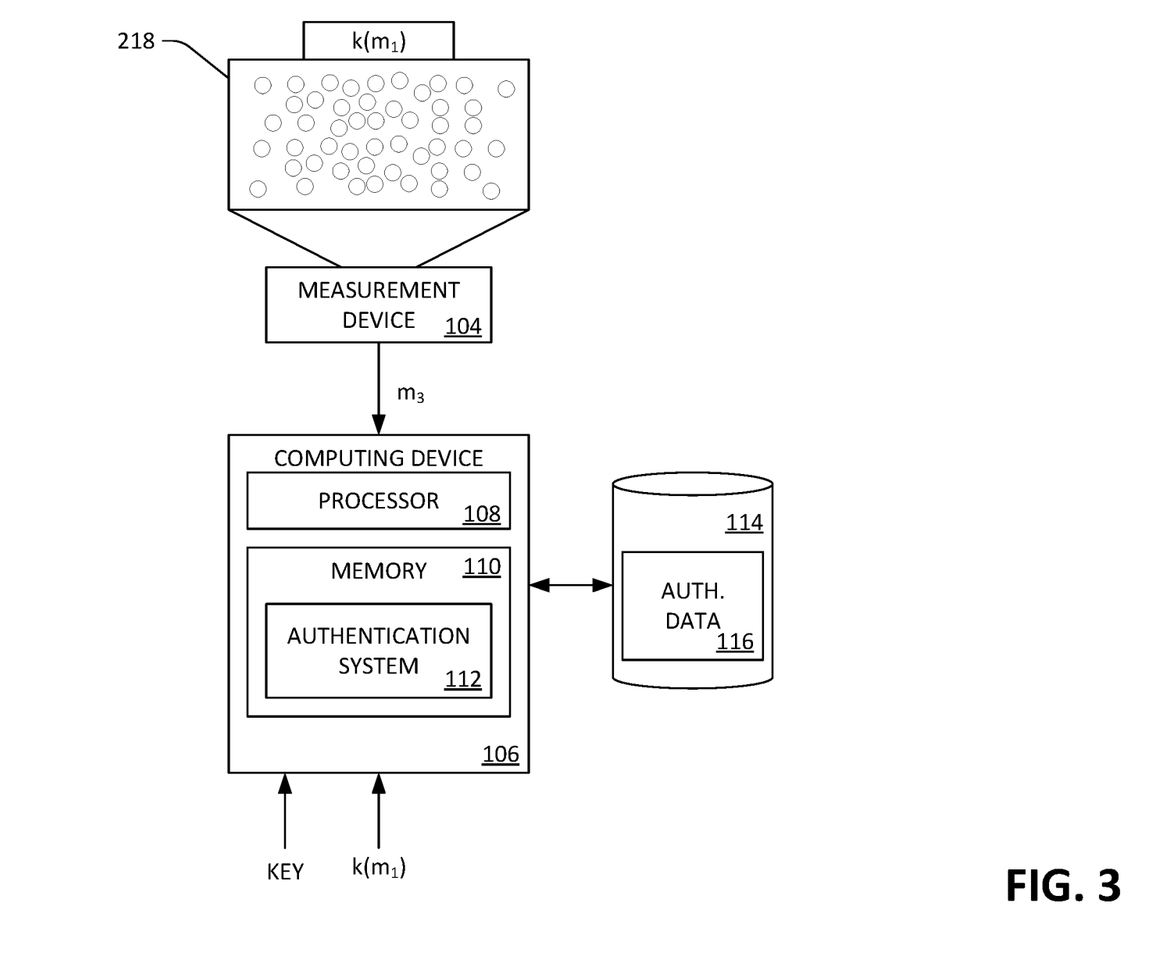
FIG. 3 is a diagram of an exemplary system for authenticating an AM object.

Turning now to FIG. 3, operation of the system 100 when authenticating the AM object 102 that has been enrolled using the process shown in FIG. 2 is illustrated. The measurement device 104 generates a measurement $m_3$ that is indicative of the second stochastic distribution of dopant incorporated into and/or onto the AM object 102, wherein $m_3$ should be approximately equivalent to $m_2$ when the AM object 102 is authentic. The computing device 106 receives $m_3$ from the measurement device 104, and further receives $k(m_1)$ (which had been applied to the AM object 102 during enrollment). For example, the computing device 202 can comprise or be in communication with an optical scanner that can read $k(m_1)$ from the surface of the AM object 102. The computing device 202 can additionally receive the key k, and can decrypt $k(m_1)$ to reproduce $m_1$ (the measurement that was indicative of the stochastic distribution of dopant into and/or onto the AM object 102 prior to the dopant applier 212 applying additional dopant to the AM object 102). The authentication system 112 then generates test authentication data based upon $m_1$ and $m_3$. For example, the authentication system 112 can use $m_1$ and $m_3$ as inputs to the function employed by the enrollment system 208 to generate the authentication data 116, thereby generating test authentication data. The authentication system 112 can then retrieve the authentication data 116 from the data store 114 and compare the authentication data 116 to the test authentication data. When the AM object 102 is authentic and free from tampering, the test authentication data and the authentication data 116 for the AM object 102 will be identical (or identical within a certain threshold range). The authentication system 112 can output an indication (e.g., a visual indication, an email, etc.) as to whether the AM object 102 is authentic based upon such comparison.

In the embodiments depicted in FIGS. 2 and 3, the enrollment system 208 and the authentication system 112 can each include a fuzzy extractor to account for noise that may exist in measurements output by the measurement devices 210 and 104. For example, during enrollment, the fuzzy extractor can receive $m_2$ and generate helper data in response to receipt of $m_2$. The enrollment system 208 can then cause the helper data to be included in the authentication data 116. During authentication, the fuzzy extractor in the authentication system 112 can receive $m_3$, and can employ the helper data to account for noise that may exist in $m_3$ (e.g., thereby regenerating $m_2$ when the AM object 218 is authentic).

Figure 4:
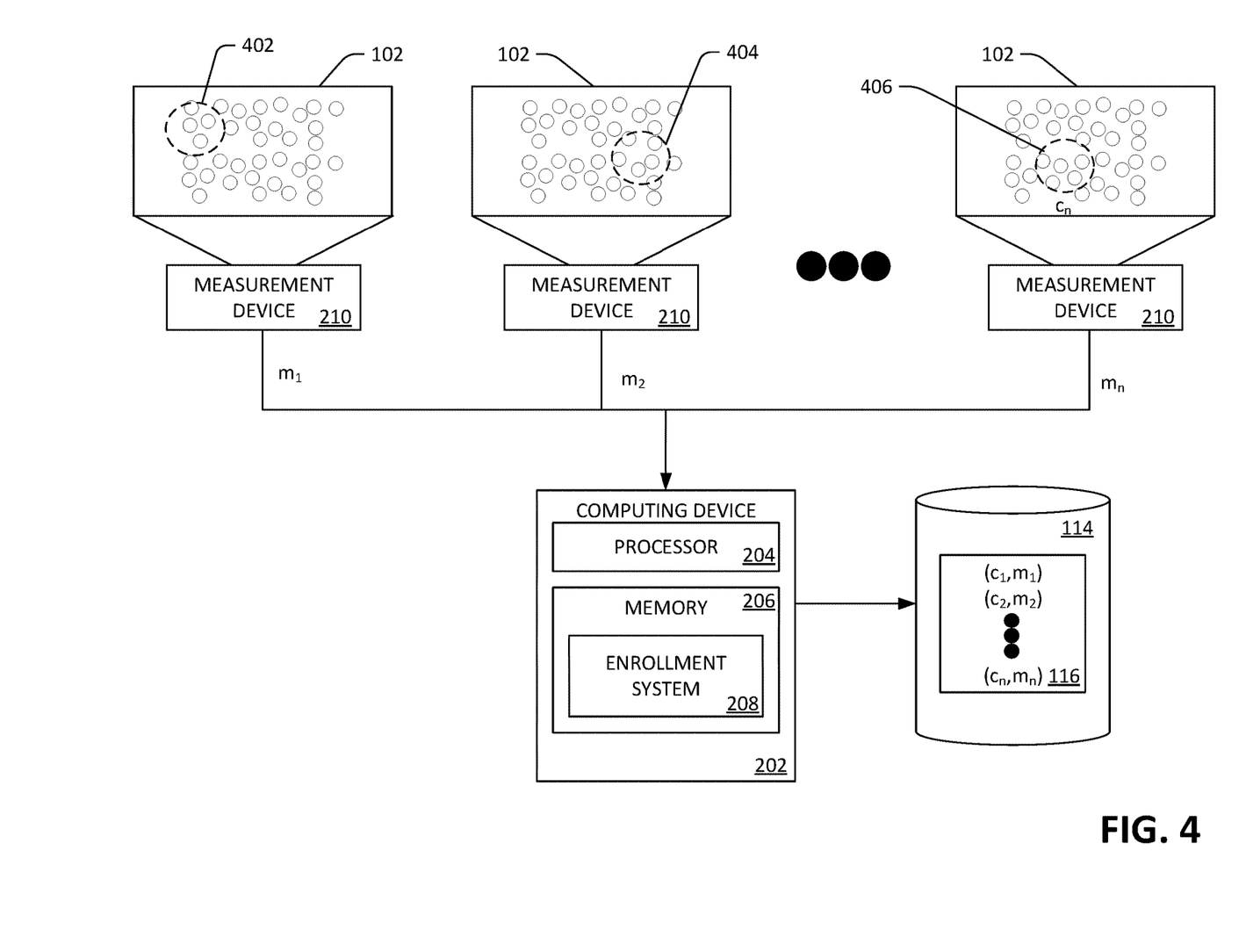
FIG. 4 is a schematic illustrating enrollment of an AM object with an authentication system.
Figure 5:
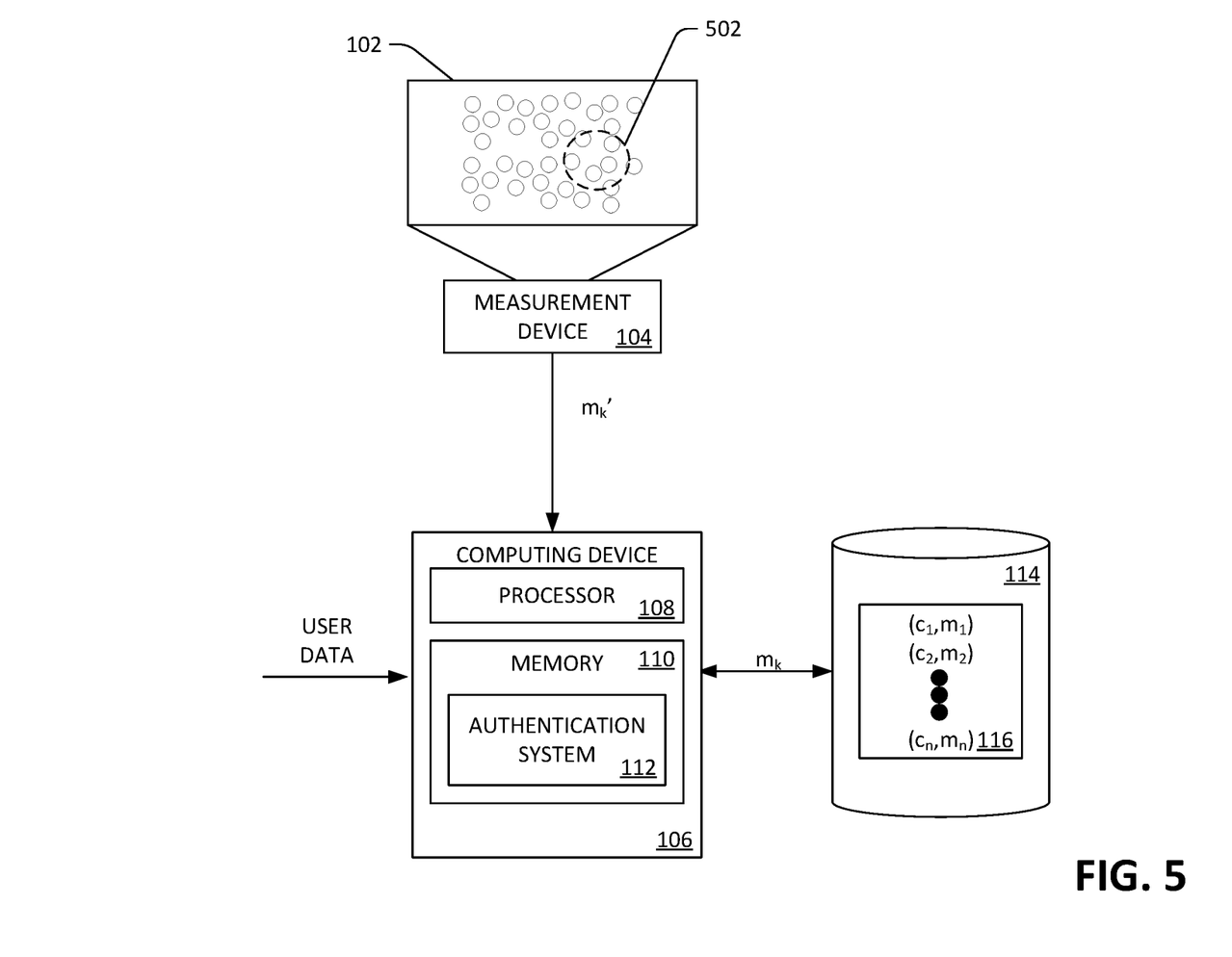
FIG. 5 is a diagram of an exemplary system for authenticating an AM object.

FIGS. 4 and 5 depict another exemplary enrollment/authentication scheme. Referring solely to FIG. 4, an approach for enrolling the AM object 102 is illustrated. As described previously, the AM object 102 has a stochastic distribution of dopant incorporated therein. Generally, the enrollment system 208 is configured to generate different challenge-response pairs based upon locations on the AM object 102 where measurements are to be taken. Thus, in the approach shown in FIG. 4, the authentication data 116 for the AM object 102 can include several challenge-response pairs for the AM object 102.

The measurement device 210 generates a first measurement $m_1$, where $m_1$ is indicative of the stochastic distribution of dopant at a first location 402 on the AM object 412. The enrollment system 208 receives $m_1$ from the measurement device, generates a challenge-response pair ($c_1$, $m_1$) that corresponds to the first location 402 on the AM object 102, and stores the challenge-response pair in the data store 114. The measurement device further generates a second measurement $m_2$, where $m_2$ is indicative of the stochastic distribution of dopant at a second location 404 on the AM object 412. As before, the enrollment system 208 receives $m_2$, generates a second challenge-response pair ($c_2$, $m_2$) that corresponds to the second location 404 on the AM object 102, and stores the second challenge-response pair in the data store 114. This process can be repeated n times, such that the measurement device 210 generates an nth measurement $m_n$ that corresponds to an nth location 406 on the AM object 102, the enrollment system 208 generates an nth challenge-response pair ($c_n$, $m_n$) that corresponds to the nth location 406, and stores the nth challenge-response pair in the data store 116. Accordingly, the authentication data 116 for the AM object 102 comprises n challenge-response pairs, with each challenge-response pair corresponding to a different location on the AM object 102.

With reference to FIG. 5, an operation of the system 100 when authenticating the AM object 102 when enrolled by way of the process described with reference to FIG. 4 is illustrated. An end user sets forth the AM object 102 for authentication, and optionally provides user data (such as a password) to the authentication system 112. The user data may correspond to a challenge $c_k$ in the challenge-response pairs stored in the data store 114, wherein, as noted above, the challenge $c_k$ corresponds to a location (e.g., location 502) on the AM object 102, and is paired with a measurement $m_k$ in the authentication data 116. In an alternative embodiment, when the user sets forth the AM object 102 for authentication, the authentication system 112 can randomly select a challenge $c_k$ included in the challenge-response pairs.

The authentication system 112 can control the measurement device 104 to generate a measurement $m_k$' at the location corresponding to the challenge $c_k$ identified by the authentication system 112. In another example, the authentication system 112 can output instructions to the user as to where to position the measurement device 104 to generate a measurement, such that a response to the challenge $c_k$ can be generated. The authentication system 112 can then compare the measurement $m_k$ in the authentication data 116 (which corresponds to the challenge $c_k$) with the measurement $m_k$', and can authenticate the AM object 102 based upon the comparison. The above-described process may optionally be repeated for multiple challenge-response pairs in order to provide further verification of the AM object 412.

Figure 6:
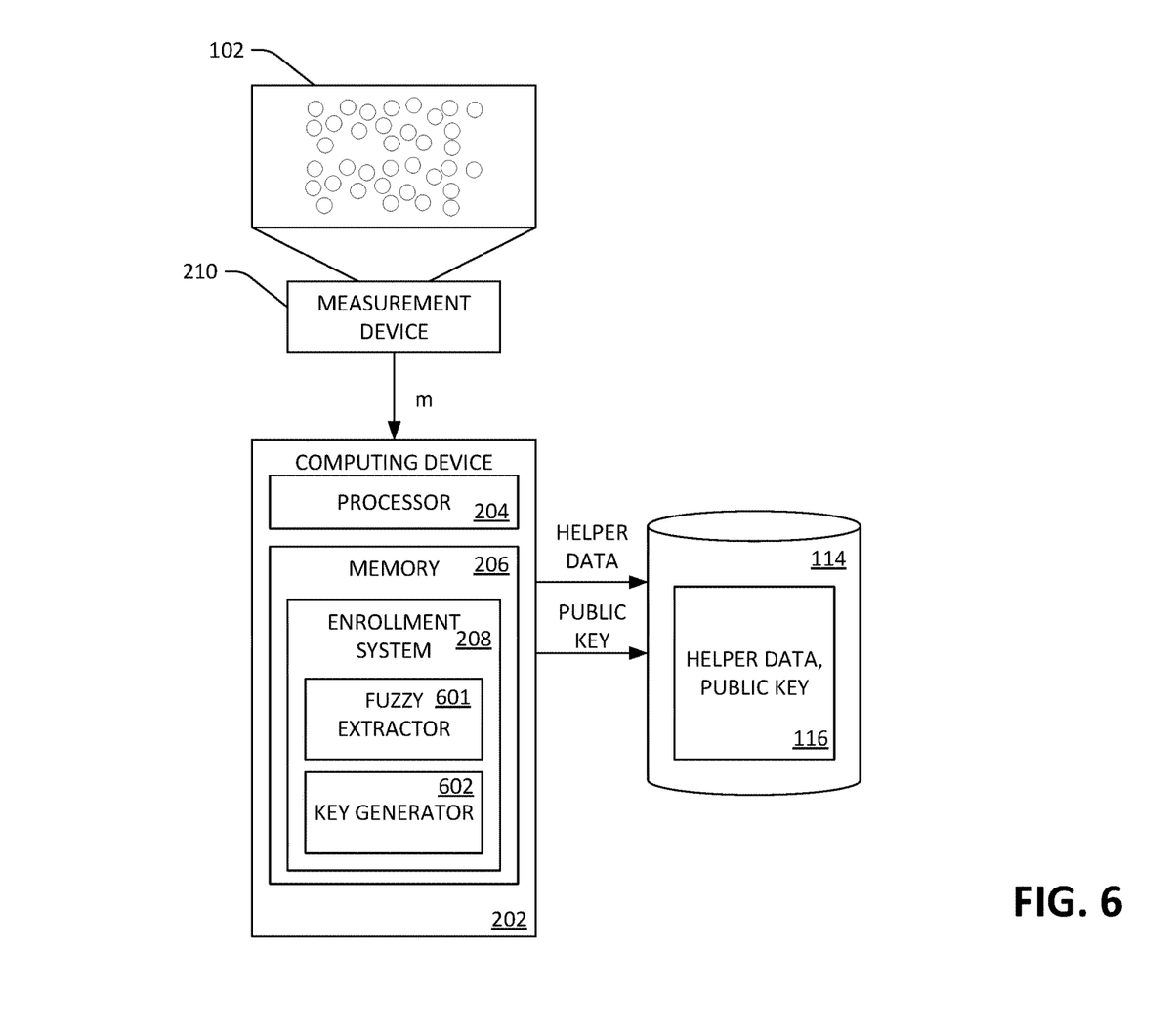
FIG. 6 is a diagram of an exemplary system for enrolling an AM object with an authentication system.

Turning now to FIG. 6, another exemplary operation of the system 200 when enrolling the AM object 102 for purposes of subsequent authentication is depicted. The measurement device 210 generates a measurement m that is indicative of the stochastic distribution of dopant in the AM object 102. The enrollment system 208 includes a fuzzy extractor 601, wherein the fuzzy extractor 601 receives the measurement m and generates helper data for such measurement. The helper data can be subsequently used to accommodate for noise that may exist when generating measurements. The enrollment system 208 can cause the helper data to be stored in the data store 114 as a portion of the authentication data 116 for the AM object 102. The enrollment system 208 also includes a key generator 602, wherein the key generator 602 receives the measurement m and generates an asymmetric (public, private) key pair using the measurement m. The enrollment system 208 can cause the public key to be stored in the data store 114 as a portion of the authentication data 116 for the AM object 102, while the private key can be discarded. Hence, in the exemplary operation depicted in FIG. 6, the authentication data 116 includes the helper data for the measurement m and the public key that has been generated based upon the measurement m.

Figure 7:
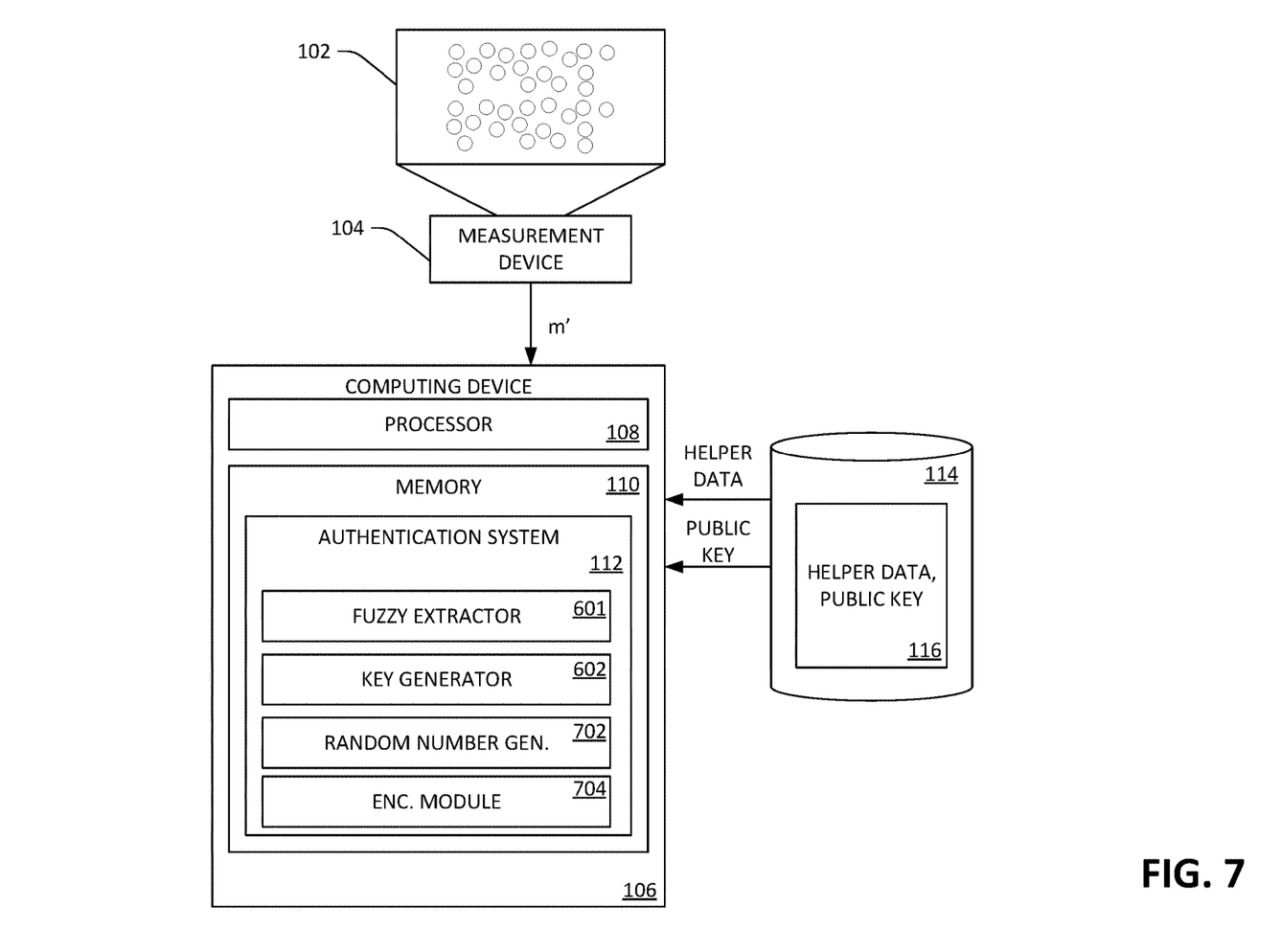
FIG. 7 is a diagram of an exemplary system for authenticating the AM object.

Turning now to FIG. 7, operation of the system 100 when authenticating the AM object 102 is illustrated, wherein the AM object 102 has been enrolled using the enrollment procedure described with respect to FIG. 7. A user can set forth the AM object 102 for authentication, and the measurement device 104 can generate a measurement m' that is indicative of the stochastic distribution of dopant incorporated into and/or onto the AM object 102. The authentication system 112 includes the fuzzy extractor 601 and the key generator 602, wherein the fuzzy extractor receives: 1) the measurement m' generated by the measurement device 104; and 2) the helper data included in the authentication data 116, and regenerates the measurement m (when the AM object 102 is authentic). The key generator 602 generates a test asymmetric (public, private) key pair, which will be equivalent to the asymmetric key pair previously generated by the key generator 602 when the AM object 102 is authentic.

The authentication system 112 further comprises a random number generator 702 that generates a random number. The authentication system 112 additionally comprises an encryption module 704, wherein the encryption module 704 encrypts the random number using the public key from the authentication data 116 to generate an encrypted random number. Subsequently, the encryption module 704 can decrypt the encrypted random number with the private key (generated based upon m') to reproduce the random number. The authentication system 112 compares the random number generated by the random number generator 702 with the random number output by the encryption module 704—when the numbers are equivalent, the authentication system 112 outputs an indication that the AM object 102 is authentic. When the numbers are not equivalent, the authentication system 112 outputs an indication that the AM object 102 is not authentic. While the above-described approach uses an asymmetric key pair, other cryptographic methods, such as symmetric key cryptography are also contemplated. In addition, combinations of the approaches described herein are contemplated.

Figure 8:
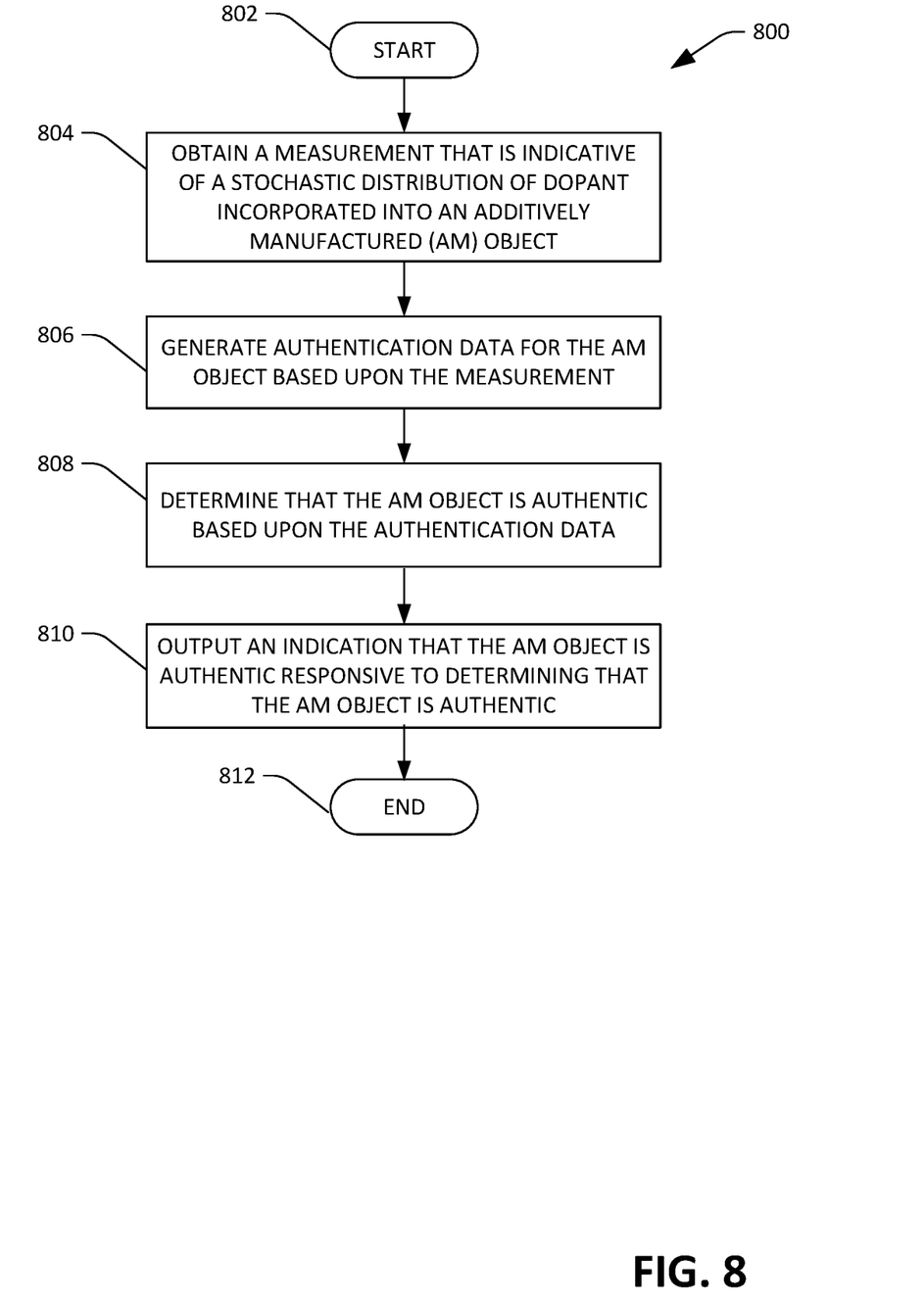
FIG. 8 is flow diagram illustrating an exemplary methodology for authenticating an AM object.

FIG. 8 illustrates an exemplary methodology relating to authenticating an AM object. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Turning now to FIG. 8, a methodology 800 executed at a computing device that facilitates authenticating an AM object is illustrated. The methodology 800 begins at 802, and at 804 the computing device obtains a measurement that is indicative of a stochastic distribution of dopant incorporated into the AM object. At 806, the computing device generates authentication data for the AM object based upon at least the measurement. At 808, the computing device determines that the AM object is authentic based upon the authentication data. At 810, the computing device outputs an indication that the AM object is authentic responsive to determining that the AM object is authentic. The methodology 800 concludes at 812.

Figure 9:
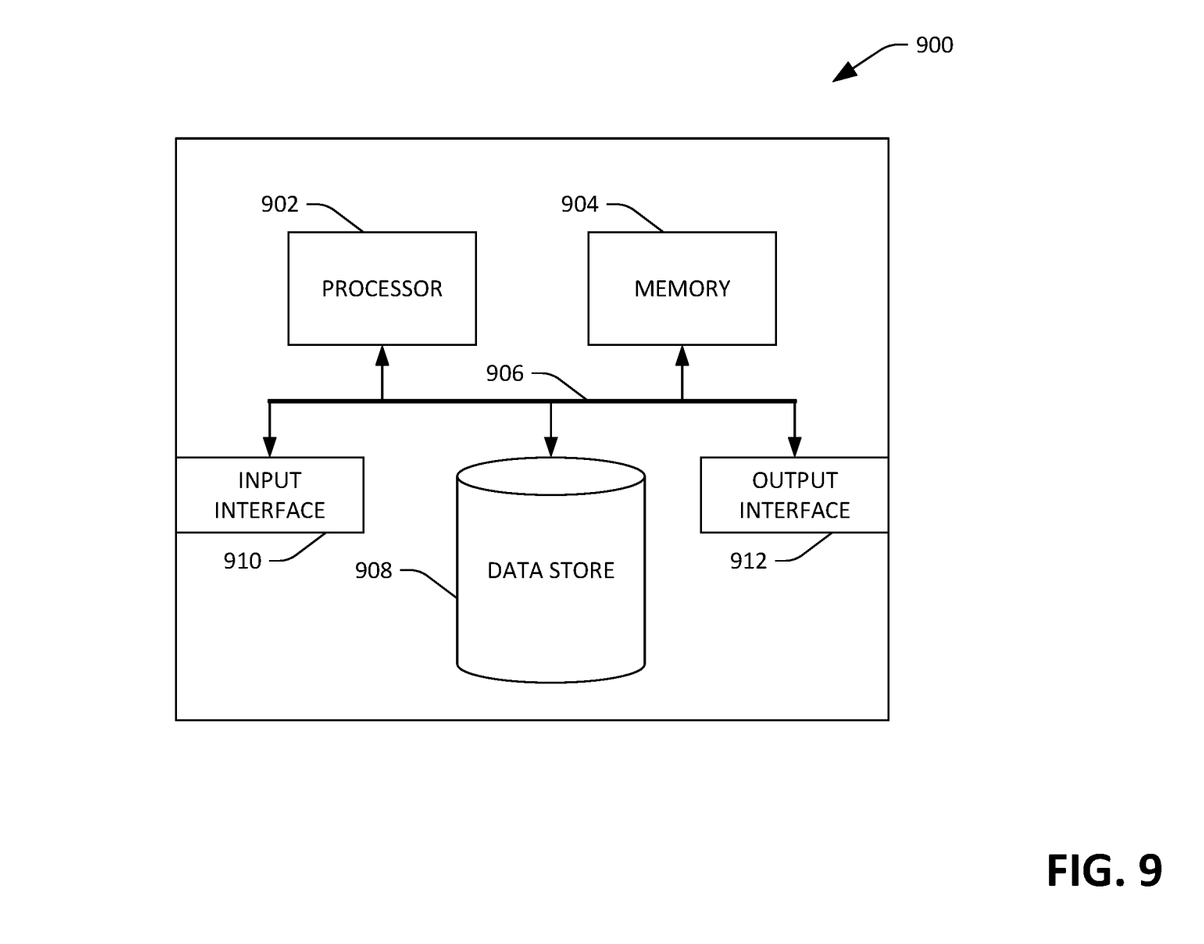
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be used in a system that facilitates authenticating an AM object. By way of another example, the computing device 900 can be used in a system that stores signatures for AM objects in a data store. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store signatures for AM objects, cryptographic keys, etc.

The computing device 900 additionally includes a data store 908 that is accessible by the processor 902 by way of the system bus 906. The data store 908 may include executable instructions, signatures for AM objects, cryptographic keys, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a computing device, the method comprising:
   authenticating an additively manufactured (AM) object, wherein authenticating the AM object comprises:
      obtaining a measurement that is indicative of a stochastic distribution of dopant incorporated into the AM object, wherein the measurement is generated by a measurement device in communication with the computing device, wherein the stochastic distribution of dopant is incorporated into the AM object based upon at least one of:

the dopant being stochastically distributed into feedstock material used to generate the AM object; or
the dopant being stochastically distributed onto a surface of the AM object;
generating test authentication data for the AM object based upon the measurement;
determining that the AM object is authentic based upon the test authentication data; and
outputting an indication that the AM object is authentic responsive to determining that the AM object is authentic.

2. The method of claim 1, wherein the AM object is determined to be authentic based further upon authentication data for the AM object, the method further comprising:
generating the authentication data for the AM object, wherein generating the authentication data for the AM object comprises:
subsequent to the AM object being manufactured, obtaining an enrollment measurement that is indicative of a first stochastic distribution of dopant incorporated into the AM object, wherein subsequent to the enrollment measurement being obtained additional dopant is incorporated into the AM object to incorporate a second stochastic distribution of dopant into the AM object; and
subsequent to obtaining the enrollment measurement, encrypting the enrollment measurement to generate an encrypted measurement, wherein the encrypted measurement is incorporated onto a surface of the AM object, and further wherein the authentication data is generated based upon the enrollment measurement.

3. The method of claim 2, wherein generating the authentication data for the AM object further comprises:
subsequent to encrypting the enrollment measurement and further subsequent to the additional dopant being incorporated into the AM object, obtaining a second enrollment measurement that is indicative of the second stochastic distribution of dopant incorporated into the AM object, wherein the authentication data is generated based upon the second enrollment measurement; and
storing the authentication data in a data store.

4. The method of claim 3, wherein generating the test authentication data comprises:
decrypting the encrypted measurement on the surface of the AM object to reproduce the enrollment measurement;
generating the test authentication data based upon the enrollment measurement and the measurement, wherein the method further comprises:
performing a comparison between the authentication data and the test authentication data; and
determining that the AM object is authentic when the comparison indicates that the authentication data and the test authentication data are equivalent.

5. The method of claim 4, wherein the authentication data and the test authentication data are bit strings, and further wherein the comparison is a bit-wise comparison between bits of the authentication data and the test authentication data.

6. The method of claim 1, wherein the dopant comprises particles of antimony, phosphorous, arsenic, boron, aluminum, gallium, sulfur, selenium, tellurium, silicon, germanium, cadmium, magnesium, zinc, or combinations thereof.

7. The method of claim 1, wherein the measurement device is an ohmmeter.

8. The method of claim 1, wherein the measurement device is a spectrometer, wherein the measurement is indicative of intensity of light reflected off of particles of the dopant.

9. The method of claim 1, wherein the AM object is determined to be authentic based further upon authentication data for the AM object, the method further comprising:
generating the authentication data for the AM object, wherein generating the authentication data for the AM object comprises:
obtaining a first enrollment measurement, the first enrollment measurement indicative of the stochastic distribution of dopant at a first location on the AM object;
including the first enrollment message in a first challenge-response pair, wherein the first challenge-response pair additionally comprises a first challenge for the first location on the AM object;
obtaining a second enrollment measurement, the second enrollment measurement indicative of the stochastic distribution of dopant at a second location on the AM object;
including the second enrollment message in a second challenge-response pair, wherein the second challenge-response pair additionally comprises a second challenge for the second location on the AM object, wherein the authentication data comprises the first challenge-response pair and the second challenge-response pair.

10. The method of claim 9, wherein authenticating the AM object further comprises:
prior to obtaining the measurement, receiving the first challenge;
responsive to receiving the first challenge, identifying the first location of the AM object that corresponds to the first challenge;
retrieving the first enrollment message from the data store based upon the first enrollment measurement being included in the first challenge-response pair with the challenge, wherein the measurement is obtained based upon the first location of the AM object that corresponds to the first challenge, and further wherein the measurement is indicative of the stochastic distribution of dopant at the first location of the AM object;
responsive to obtaining the measurement, comparing the measurement with the first enrollment measurement; and
determining that the AM object is authentic when the measurement and the first enrollment measurement are within a threshold similarity level of one another.

11. The method of claim 10, wherein the threshold similarity level is from 95 to 100%.

12. The method of claim 1, wherein authenticating the AM object further comprises:
generating a cryptographic key based upon the measurement, wherein the test authentication data comprises the cryptographic key.

13. The method of claim 12, wherein the cryptographic key is further generated based upon helper data output by a fuzzy extractor.

14. A computing system comprising:
at least one processor; and
memory storing instructions that, when executed by the at least one processor, cause the at least one processor to perform acts comprising:

authenticating an additively manufactured (AM) object, wherein authenticating the AM object comprises:
obtaining a measurement that is indicative of a stochastic distribution of dopant incorporated into the AM object, wherein the measurement is generated by a measurement device in communication with the computing device, wherein the stochastic distribution of dopant is incorporated into the AM object based upon at least one of:
the dopant being stochastically distributed into feedstock material used to generate the AM object; or
the dopant being stochastically distributed onto a surface of the AM object;
generating test authentication data for the AM object based upon the measurement;
determining that the AM object is authentic based upon the test authentication data; and
outputting an indication that the AM object is authentic responsive to determining that the AM object is authentic.

15. The computing system of claim 14, wherein the AM object is determined to be authentic based further upon authentication data for the AM object, the acts further comprising:
generating the authentication data for the AM object, wherein generating the authentication data for the AM object comprises:
subsequent to the AM object being manufactured, obtaining an enrollment measurement that is indicative of a first stochastic distribution of dopant incorporated into the AM object, wherein subsequent to the enrollment measurement being obtained additional dopant is incorporated into the AM object to incorporate a second stochastic distribution of dopant into the AM object; and
subsequent to obtaining the enrollment measurement, encrypting the enrollment measurement to generate an encrypted measurement, wherein the encrypted measurement is incorporated onto a surface of the AM object, and further wherein the authentication data is generated based upon the enrollment measurement.

16. The computing system of claim 15, wherein generating the authentication data for the AM object further comprises:
subsequent to encrypting the enrollment measurement and further subsequent to the additional dopant being incorporated into the AM object, obtaining a second enrollment measurement that is indicative of the second stochastic distribution of dopant incorporated into the AM object, wherein the authentication data is generated based upon the second enrollment measurement; and
storing the authentication data in a data store.

17. The computing system of claim 16, wherein generating the test authentication data comprises:
decrypting the encrypted measurement on the surface of the AM object to reproduce the enrollment measurement;
generating the test authentication data based upon the enrollment measurement and the measurement, wherein the method further comprises:
performing a comparison between the authentication data and the test authentication data; and
determining that the AM object is authentic when the comparison indicates that the authentication data and the test authentication data are equivalent.

18. The computing system of claim 17, wherein the authentication data and the test authentication data are bit strings, and further wherein the comparison is a bit-wise comparison between bits of the authentication data and the test authentication data.

19. The computing system of claim 14, wherein the dopant comprises particles of antimony, phosphorous, arsenic, boron, aluminum, gallium, sulfur, selenium, tellurium, silicon, germanium, cadmium, magnesium, zinc, or combinations thereof.

20. A computer-readable storage medium comprising instructions that, when executed by a processor of a computing device, cause the processor to perform acts comprising:
obtaining a measurement that is indicative of a stochastic distribution of dopant incorporated into an AM object or onto a surface of the AM object, wherein the measurement is performed by a measurement device in communication with the processor;
generating authentication data for the AM object based upon the measurement;
determining that the AM object is authentic based upon the authentication data; and
outputting an indication that the AM object is authentic responsive to determining that the AM object is authentic.

* * * * *